United States Patent
Wang et al.

(10) Patent No.: US 10,493,480 B2
(45) Date of Patent: Dec. 3, 2019

(54) DEVICE FOR THE AUTOMATIC POWDER CLEANING PROCESS FOR WHEEL BOLT HOLES

(71) Applicant: CITIC Dicastal CO.,LTD, Qinhuangdao (CN)

(72) Inventors: Zaide Wang, Qinhuangdao (CN); Huanming Ma, Qinhuangdao (CN); Hongtao Wang, Qinhuangdao (CN); Zhiwei Qin, Qinhuangdao (CN); Bo Ning, Qinhuangdao (CN); Lei Bao, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 13 days.

(21) Appl. No.: 15/693,987

(22) Filed: Sep. 1, 2017

(65) Prior Publication Data
US 2018/0333734 A1   Nov. 22, 2018

(30) Foreign Application Priority Data
May 19, 2017   (CN) .......................... 2017 1 0358710

(51) Int. Cl.
| | |
|---|---|
| B05B 12/30 | (2018.01) |
| B08B 15/04 | (2006.01) |
| B08B 5/04 | (2006.01) |
| G06K 7/10 | (2006.01) |
| G05B 19/12 | (2006.01) |
| B05B 14/10 | (2018.01) |
| G05B 19/042 | (2006.01) |
| G06F 16/95 | (2019.01) |

(52) U.S. Cl.
CPC .............. *B05B 12/30* (2018.02); *B05B 14/10* (2018.02); *B08B 5/04* (2013.01); *B08B 15/04* (2013.01); *G05B 19/042* (2013.01); *G05B 19/12* (2013.01); *G06K 7/10297* (2013.01); *G05B 2219/23189* (2013.01); *G06F 16/95* (2019.01)

(58) Field of Classification Search
CPC .... B05B 12/30; B05B 14/10; G06K 7/10297; G05B 19/12; G05B 2219/23189; B08B 15/04; G06F 16/95
USPC ................................................... 15/303, 319
See application file for complete search history.

(56) References Cited

U.S. PATENT DOCUMENTS

| | | | |
|---|---|---|---|
| 10,040,433 B1* | 8/2018 | Xue ........................ B60S 3/042 |
| 2004/0148050 A1* | 7/2004 | Brosi ........................ B08B 5/04 |
| | | | 700/123 |
| 2016/0263610 A1* | 9/2016 | Sakita ................ B01D 46/0068 |
| 2017/0002460 A1* | 1/2017 | Keller ................ B05B 13/0221 |

* cited by examiner

*Primary Examiner* — David Redding
(74) *Attorney, Agent, or Firm* — Calfee, Halter & Griswold LLP

(57) ABSTRACT

The present application discloses an automatic powder cleaning process and device for wheel bolt holes. The device comprises a vacuum pump, a steady pressure tank, a powder cleaning robot, a powder cleaning gun, a control system and accessories. According to the process and the device, shielded protection is canceled, and powder at the mounting part of a wheel bolt hole is automatically cleaned, so that the process and the device are suitable for various wheel products, and the labor and the labor cost are reduced; the problems that a lot of different types of protective plugs needed for wheels are inconvenient to customize and store and high in cost are avoided.

4 Claims, 1 Drawing Sheet

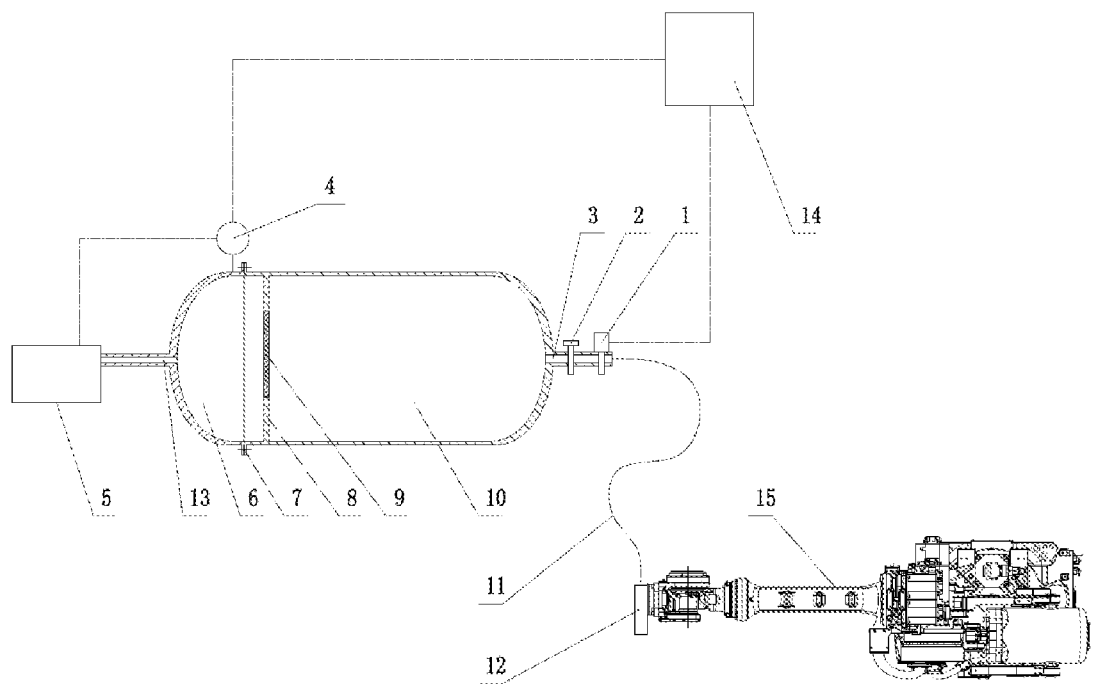

DEVICE FOR THE AUTOMATIC POWDER CLEANING PROCESS FOR WHEEL BOLT HOLES

CROSS-REFERENCE TO RELATED APPLICATIONS

This application claims priority to Chinese Patent Application No. 201710358710.5, filed on May 19, 2017, which is hereby incorporated by reference in its entirety.

TECHNICAL FIELD

The present application relates to a spraying process and device, and specifically, to a process and a device for protecting a mounting surface of a wheel sprayed bolt hole.

BACKGROUND ART

The wheel bolt hole assembly part involves in the safety of automobile assembly, and when a powder spraying process is performed on a wheel, the protection on the mounting part of a bolt hole is extremely important. Shielded protection adopted in the wheel surface powder spraying technical field at present has the following defects: protective plugs need to be assembled and disassembled artificially, so that the labor intensity and the cost are high; a lot of different types of protective plugs needed for wheels having a variety of bolt holes are inconvenient to customize and store and high in cost; the protective plugs assembled and disassembled artificially are easy to miss or misplace, thus causing rejects; the paint drop treatment needed after the protective plugs are used for a period of time may pollute the environment, and a large batch of rejects may be caused by incomplete cleaning; and the protective plugs may drop when equipment vibrates, thus causing rejects, chain blockage and equipment fault.

SUMMARY OF THE INVENTION

Based on the above defects in the prior art, the present application provides an automatic powder cleaning process and device for wheel bolt holes.

The present application adopts the following technical solution for solving the technical problems: an automatic powder cleaning process for wheel bolt holes comprises the process flow of feeding a wheel to be sprayed, recognizing a wheel model, recognizing a brace, storing wheel model information, delivering the wheel to a powder spraying area, reading the wheel model information, spraying powder at a powder spraying station, completing powder spraying, cleaning powder at a powder cleaning station, completing powder cleaning, baking and curing, and discharging a product.

"Storing wheel model information" refers to, after a wheel recognition device recognizes the wheel model, store wheel feature information into a database according to the tag of the corresponding brace, wherein the wheel feature information is used for guiding the powder cleaning device to complete the powder cleaning operation according to the mounting parts of specific bolt holes of different wheel models by calling different programs.

"Reading the wheel model information" refers to that, when the brace arrives at a tag read-write device, the tag read-write device reads the tag arranged below the brace, compares the tag with the data in the database to obtain feature information of the wheel on the brace, and sends the feature information to a powder cleaning robot via a weak current network.

Further, a wheel model recognition system is a visual recognition system, and is used for inputting and recognizing all wheel model image information before production and editing wheel model code information corresponding to images one by one.

Further, a wheel model recognition system is a two-dimensional code recognition system, is used for printing a two-dimensional code at the selected part of the inner cavity of each wheel, and comprises a two-dimensional code scanning gun arranged at the bottom.

Further, a read-write tag is an RFID tag, and the corresponding read-write device is an RFID reader-writer.

Further, the read-write tag is a two-dimensional code tag, and the corresponding read-write device is a dedicated scanning reader-writer.

An automatic powder cleaning device for wheel bolt holes, comprising a vacuum pump, a steady pressure tank, a powder cleaning robot, a powder cleaning gun, a control system and accessories, wherein the steady pressure tank is divided into a vacuum cavity and a powder storage cavity by a filter device, the air outlet of the vacuum cavity is connected with the air suction port of the vacuum pump, a digital pressure gauge is arranged in the vacuum cavity, the vacuum pump and the digital pressure gauge are connected with the control system via weak current lines, the powder suction port of the powder storage cavity is connected with the powder cleaning gun via a hose, the powder cleaning gun is mounted at the top of the powder cleaning robot, the powder cleaning robot is connected with the control system via the weak current lines, an automatic control switch and a manual switch are arranged at the powder suction port, and the automatic control switch is connected with the control system via the weak current lines.

Further, the steady pressure tank is of a split structure, and two split parts of the steady pressure tank are mounted together via a flange mounting surface.

Further, the filter device comprises a division plate fixed together with the inner wall of the steady pressure tank and a filter mounted on the division plate.

Further, the control system comprises a pressure control system communicating with the vacuum pump and the digital pressure gauge, a switch control system communicating with the automatic control switch as well as a powder cleaning program database and a powder cleaning operation control system communicating with the powder cleaning robot.

In the present application, the traditional shielded protection is canceled, powder at the mounting part of a wheel bolt hole is automatically cleaned by virtue of information-based application, simultaneously, the process and the device are suitable for multiple wheel products, and the labor and the labor cost are reduced; the problems that a lot of different types of protective plugs needed for wheels having a variety of bolt holes are inconvenient to customize and store and high in cost are avoided; the risk of rejects caused by missing or misplacing the protective plugs assembled and disassembled artificially is prevented; the environmental pollution caused by paint drop treatment after the protective plugs are used for a period of time and the risk of a large batch of rejects caused by incomplete cleaning are avoided; the risk of rejects and equipment fault caused by dropping of the protective plugs when equipment vibrates is avoided; and the sucked powder can be reused, so that the process cost is greatly reduced.

BRIEF DESCRIPTION OF DRAWINGS

FIG. 1 is an automatic powder cleaning device for wheel bolts in the present application.

In figures: 1—automatic control switch, 2—manual switch, 3—powder suction port, 4—digital pressure gauge, 5—vacuum pump, 6—vacuum cavity, 7—flange mounting surface, 8—division plate, 9—filter, 10—powder storage cavity, 11—hose, 12—powder cleaning gun, 13—the air outlet of the vacuum cavity, 14—control system, 15—powder cleaning robot.

DETAILED DESCRIPTION OF THE INVENTION

The present application will be further described in detail below in combination with the embodiments and the accompanying drawing.

An automatic powder cleaning process for wheel bolt holes comprises the process flow of feeding a wheel to be sprayed, recognizing a wheel model, recognizing a brace, storing wheel model information, delivering the wheel to a powder spraying area, reading the wheel model information, spraying powder at a powder spraying station, completing powder spraying, cleaning powder at a powder cleaning station, completing powder cleaning, baking and curing, and discharging a product. As shown in FIG. 1, a device for the above automatic powder cleaning process for wheel bolt holes comprises a vacuum pump 5, a steady pressure tank, a powder cleaning robot 15, a powder cleaning gun 12, a control system 14 and accessories, wherein the steady pressure tank is divided into a vacuum cavity 6 and a powder storage cavity 10 by a division plate 8 and a filter 9, the air outlet 13 of the vacuum cavity 6 is connected with the air suction port of the vacuum pump 5, a digital pressure gauge 4 is arranged in the vacuum cavity 6, the vacuum pump 5 and the digital pressure gauge 4 are connected with a pressure control system via weak current lines, the powder suction port 3 of the powder storage cavity 10 is connected with the powder cleaning gun 12 via a hose 11, the powder cleaning gun 12 is mounted at the top of the powder cleaning robot, the powder cleaning robot is connected with a powder cleaning program database and a powder cleaning operation control system via the weak current lines, an automatic control switch 1 and a manual switch 2 are arranged at the powder suction port 3, and the automatic control switch 1 is connected with a switch control system via the weak current lines; the steady pressure tank is of a split structure, and the two split parts are mounted together via a flange mounting surface 7.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present application, as well as various alternatives and modifications thereof. It is intended that the scope of the invention be defined by the Claims appended hereto and their equivalents.

What is claimed is:

1. A device for the automatic powder cleaning process for wheel bolt holes, comprising a vacuum pump, a steady pressure tank, a powder cleaning robot, a powder cleaning gun, a control system and accessories, wherein the steady pressure tank is divided into a vacuum cavity and a powder storage cavity by a filter device, the air outlet of the vacuum cavity is connected with the air suction port of the vacuum pump, a digital pressure gauge is arranged in the vacuum cavity, the vacuum pump and the digital pressure gauge are connected with the control system via weak current lines, the powder suction port of the powder storage cavity is connected with the powder cleaning gun via a hose, the powder cleaning gun is mounted at the top of the powder cleaning robot, the powder cleaning robot is connected with the control system via the weak current lines, an automatic control switch and a manual switch are arranged at the powder suction port, and the automatic control switch is connected with the control system via the weak current lines.

2. The automatic powder cleaning device for wheel bolt holes as described in claim 1, wherein the steady pressure tank is of a split structure, and two split parts of the steady pressure tank are mounted together via a flange mounting surface.

3. The automatic powder cleaning device for wheel bolt holes as described in claim 1, wherein the filter device comprises a division plate fixed together with the inner wall of the steady pressure tank and a filter mounted on the division plate.

4. The automatic powder cleaning device for wheel bolt holes as described in claim 1, wherein the control system comprises a pressure control system communicating with the vacuum pump and the digital pressure gauge, a switch control system communicating with the automatic control switch as well as a powder cleaning program database and a powder cleaning operation control system communicating with the powder cleaning robot.

\* \* \* \* \*